W. H. WAKFER.
FILE.
APPLICATION FILED SEPT. 25, 1912.
1,082,219.
Patented Dec. 23, 1913.
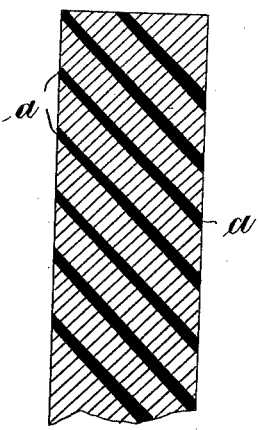
Fig: 1
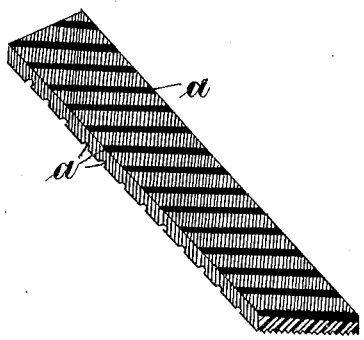
Fig: 2.
WITNESSES
Cornelius Hoving
Frank H Logan
INVENTOR
W.H. WAKFER
BY
ATTORNEY

UNITED STATES PATENT OFFICE.

WILLIAM HENRY WAKFER, OF SOUTH NORWOOD, ENGLAND, ASSIGNOR TO HIMSELF, AND SAMUEL PECK, OF CALBOURNE, ENGLAND.

FILE.

1,082,219. Specification of Letters Patent. Patented Dec. 23, 1913.

Application filed September 25, 1912. Serial No. 722,240.

*To all whom it may concern:*

Be it known that I, WILLIAM HENRY WAKFER, a subject of the King of Great Britain and Ireland, residing at 67 Whitworth road, South Norwood, in the county of Surrey, England, have invented new and useful Improvements in and Relating to Files, of which the following is a specification.

This invention relates to that class of flat files in which there is only one cut of teeth running diagonally across the face of the file at an angle adapted to give a shearing cut for example 35° or 45° to the body of the file, and has for its object the provision of improved means for clearing the filings from the teeth of such a file so that any clogging effect of the filings on the teeth is avoided.

It has been proposed in the past to use clearance channels or grooves, transversely disposed across the face of the file in order to form channels or grooves along which the filings can be discharged laterally, but if the channels or grooves are sufficiently deep to allow the filings to get away as an accumulated amount from the series of teeth entering each channel or groove the file is unnecessarily weakened at those parts and readily breaks.

My present invention consists in forming in files of the type referred to, which produce filings of a curly nature, such clearance channels or grooves of a varying section along their length so that the section of each channel or groove at the delivery end is greater than that at the opposite end, in other words, the section is varied in order to deal with the stream of curly filings accumulated in bulk from the successive teeth along the channel or groove. By this means I am enabled to obtain a much greater gripping balancing and clearing effect without reducing the strength of the file compared with the uniform area of channel or groove large enough to deal with the whole of the curly filings delivered into it. The channels or grooves may be made either deeper or wider along their length to vary the cross section as circumstances may require, or equivalently both dimensions may be subject to variation, and they may be straight, curved, or of any other form, so long as the capacity of the groove along the length is arranged to deal with the cumulative amount of filings from the large number of teeth traversed by the channel or groove. These varying or graduating channels for the combined gripping of work balancing and clearance of filings are either produced by means of stamping tools, press dies, rolling, or otherwise shaped cold, or may be produced by hot stamping, pressing, rolling or otherwise if desired before grinding the blanks. Alternatively and preferably, the teeth may be either machine cut, hand cut, or otherwise procured after the blanks are ground or otherwise prepared, and the graduating channels afterward procured by milling, shaping, or other suitable means.

In order that the invention may be the better understood, I will now proceed to describe the same in relation to the accompanying drawings, reference being had to the letters and figures marked thereon, like letters referring to like parts in the various figures, in which:—

Figure 1 is a face view of a file of the single cut type and of the angularity of teeth referred to, to which this invention relates, with channels or grooves of varying width. Fig. 2 is a sectional view of a similar file showing channels or grooves of varying depth.

It will be seen that the channel or groove is comparatively shallow at one end, and may be either deeper, broader, or both, at the other or delivery end, so that the sectional area is varied in value as is hereinbefore described and has the same functional effect in gripping the work, and in the clearance of filings.

I claim:

A file, having a single cut of parallel cutting teeth diagonally disposed across the body of the file at an angle adapted to produce a shearing cut, and clearance channels disposed transversely across the said cutting teeth, the cross sectional area of each channel gradually increasing toward the delivery end of such channel so as to collect and deliver the filings removed from the cutting teeth traversing the channel, substantially as described.

In testimony whereof I have signed my name to this specification in the presence of two subscribing witnesses.

WILLIAM HENRY WAKFER.

Witnesses:
RICHARD A. HOFFMANN,
WALTER CARVEL.

Copies of this patent may be obtained for five cents each, by addressing the "Commissioner of Patents, Washington, D. C."